United States Patent
Geib et al.

(10) Patent No.: US 7,735,085 B2
(45) Date of Patent: Jun. 8, 2010

(54) SYSTEM FOR APPLICATION PRIORITY BASED ON DEVICE OPERATING MODE

(75) Inventors: Kenneth M. Geib, San Diego, CA (US); Mahesh Moorthy, San Diego, CA (US); Marc Edward Nijdam, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 953 days.

(21) Appl. No.: 10/854,983

(22) Filed: May 26, 2004

(65) Prior Publication Data

US 2005/0268014 A1    Dec. 1, 2005

(51) Int. Cl.
G06F 9/46 (2006.01)
G06F 15/173 (2006.01)
G06F 12/00 (2006.01)
(52) U.S. Cl. .......................... 718/104; 709/226; 710/240
(58) Field of Classification Search ................. 718/104; 709/104, 226; 710/240
See application file for complete search history.

(56) References Cited

U.S. PATENT DOCUMENTS

| | | | |
|---|---|---|---|
| 6,438,705 B1 | 8/2002 | Chao et al. | |
| 6,604,160 B1 * | 8/2003 | Le et al. | 710/240 |
| 7,096,008 B2 | 8/2006 | Han | |
| 7,107,590 B2 * | 9/2006 | Bril et al. | 718/103 |
| 2002/0007422 A1 * | 1/2002 | Bennett | 709/246 |
| 2003/0154233 A1 * | 8/2003 | Patterson | 709/104 |
| 2004/0023646 A1 | 2/2004 | Inami et al. | |
| 2005/0240805 A1 * | 10/2005 | Schnapp et al. | 714/6 |

FOREIGN PATENT DOCUMENTS

| | | |
|---|---|---|
| EP | 0964332 | 12/1999 |
| EP | 1387593 | 2/2004 |
| JP | 04-085632 | 3/1992 |
| JP | 06-098020 | 4/1994 |
| JP | 06-214976 | 8/1994 |
| WO | 99045454 | 9/1999 |

(Continued)

OTHER PUBLICATIONS

International Search Report-PCT/US05/018607, ISA/US-Jul. 3, 2007.

(Continued)

*Primary Examiner*—Meng-Ai An
*Assistant Examiner*—Camquy Truong
(74) *Attorney, Agent, or Firm*—Brent A. Boyd; Nicholas A. Cole

(57) ABSTRACT

System for application priority based on device operating mode. A method is provided for allocating a top visible resource on a device. The method includes receiving a request requesting allocation of the top visible resource to a requesting application, and determining that the top visible resource is allocated to an owning application. The method also includes associating owner information with requester information to form an arbitration request. The method also includes arbitrating the arbitration request to produce an arbitration decision that indicates that the top visible resource is to be allocated to the requesting application if the owner information indicates that the owning application is privileged and an identifier that identifies the requesting application is contained in a relinquish list associated with the owner information.

41 Claims, 7 Drawing Sheets

FOREIGN PATENT DOCUMENTS

WO 03003658 1/2003

OTHER PUBLICATIONS

Silberschatz A et al: "Operating System Concepts, Passage" Operating System Concepts, XX, XX, 1994, pp. I-III, 97, XP002357389.

Supplementary European Search Report-EP05754765, Search Authority-Munich-Feb. 25, 2008.

Written Opinion-PCT/US05/018607, ISA/US-Jul. 3, 2007.

* cited by examiner

SYSTEM FOR APPLICATION PRIORITY BASED ON DEVICE OPERATING MODE

BACKGROUND

1. Field

The present invention relates generally to the operation of device, and more particularly, to a system for application priority based on device operating mode.

2. Description of the Related Art

Advances in technology have resulted in the development and deployment of extensive data networks. These networks include both public data networks, such as the Internet, and specialized networks, such as wireless telecommunication networks. Users of these networks have the ability to access a wide variety of information and services that are available. For example, wireless device owners may now download a wide variety of applications for execution on their devices.

Resource allocation has become increasingly important as a result of the increase in downloadable applications. Device resources include displays, keypads, sound processors, modems, storage devices, communication channels, and other types of resources. Because each device has a limited number of resources, the way those resources are allocated to competing applications determines how the device operates. For example, a wireless telephone may be in a voice call, a data call, running an application, or handling an SMS message, and the device needs to know how to allocate its resources to various applications given a particular operating condition.

A very important resource for most devices is referred to as the "top visible" resource (TVR) (also sometimes referred to as "having scope"). The top visible resource generally comprises the device's display and the device's input device (i.e., keypad), which allow applications to represent to the user that they are the current focus of the device. For example, an application that is allocated the top visible resource is able to interact with the device user via the display and keypad.

There is a need to effectively arbitrate between competing applications executing on a device to determine which application should get access to the top visible resource. For example, the operation of the device, which determines the "user experience", is determined by how applications are allocated the top visible resource.

In current systems, the top visible resource is allocated to an application according to static rules. For example, in a telephone handset device, applications are not allowed to start when a phone call is in progress. Typically, an application's access to the top visible resource is controlled by hard-coded allocation rules that do not take into account the dynamic environment in which the current device operates.

Therefore, what is needed is a dynamic application priority system that operates to determine which application in a device is allocated the top visible resource based on the operating environment of the device. The system should also provide a mechanism to allow third parties, such as network carriers, to have an input as to how the top visible resource on the device is allocated, so that the user experience provided by the device can be dynamically controlled.

SUMMARY

In one or more embodiments, an application priority system is provided that operates to dynamically allocate the top visible resource of a device. In one embodiment, a method is provided for operating an application priority system to allocate a top visible resource on a device. The method comprises receiving a request requesting allocation of the top visible resource to a requesting application, and determining that the top visible resource is allocated to an owning application. The method also comprises associating owner information with requester information to form an arbitration request, wherein the owner information comprises information about the owning application and the requester information comprises information about the requesting application. The method also comprises arbitrating the arbitration request to produce an arbitration decision that indicates that the top visible resource is to be allocated to the requesting application if the owner information indicates that the owning application is privileged and an identifier that identifies the requesting application is contained in a relinquish list associated with the owner information. The method also comprises allocating the top view resource based on the arbitration decision.

In one embodiment, apparatus is provided for operating an application priority system to dynamically allocate a top visible resource on a device. The apparatus comprises a resource manager that operates to allocate the top visible resource to an owning application, and receive a request for allocation of the top visible resource from a requesting application. The apparatus also comprises arbitration logic that operates to allocate the top visible resource to the owning application if the owning application is privileged and has not identified the requesting application in a relinquish list. The arbitration logic also operates to arbitrate the allocation of the top visible resource between the owning application and the requesting application if the owning application is privileged and has identified the requesting application in the relinquish list. The arbitration logic also operates to arbitrate the allocation of the top visible resource between the owning application and the requesting application if the owning application is not privileged.

In one embodiment, apparatus is provided for operating an application priority system to dynamically allocate a top visible resource on a device. The apparatus comprises means for allocating the top visible resource to an owning application, and means for receiving a request for allocation of the top visible resource from a requesting application. The apparatus also comprises means for allocating the top visible resource to the owning application if the owning application is privileged and has not identified the requesting application in a relinquish list. The apparatus also comprises means for arbitrating the allocation of the top visible resource between the owning application and the requesting application if the owning application is privileged and has identified the requesting application in the relinquish list. The apparatus also comprises means for arbitrating the allocation of the top visible resource between the owning application and the requesting application if the owning application is not privileged.

In one embodiment, a computer-readable media is provided that comprises instructions, which when executed by a processor in a device, operate to provide an application priority system to dynamically allocate a top visible resource on a device. The computer-readable media comprises instructions for allocating the top visible resource to an owning application, and instructions for receiving a request for allocation of the top visible resource from a requesting application. The computer-readable media also comprises instructions for allocating the top visible resource to the owning application if the owning application is privileged and has not identified the requesting application in a relinquish list. The computer-readable media also comprises instructions for arbitrating the allocation of the top visible resource between the owning application and the requesting application if the owning application is privileged and has identified the requesting application in the relinquish list. The computer-readable media also comprises instructions for arbitrating the allocation of the top visible resource between the owning application and the requesting application if the owning application is not privileged.

Other aspects, advantages, and features of the present invention will become apparent after review of the hereinafter set forth Brief Description of the Drawings, Detailed Description, and the claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes one or more embodiments of an application priority system that operates to dynamically allocate the top visible resource in a device. In one embodiment, applications request the allocation of the top visible resource by transmitting an allocation request to a resource manager. The allocation request is combined with one or more parameters that describe the status of the top visible resource and its current owner to form an arbitration request. An arbiter processes the arbitration request according to arbitration rules to produce an arbitration decision that indicates how the resource is to be allocated. The arbitration decision is then used to allocate the top visible resource. The system is suitable for use with any type of wired or wireless device, including but not limited to, desktop computers, notebook computers, wireless telephones, pagers, PDAs, email devices, tablet computers, or any other type of wired or wireless devices.

In one or more embodiments, the application priority systems interacts with a runtime environment executing on the device that is used to simplify operation of the device, such as by providing generalized calls for device specific resources. One such runtime environment is the Binary Runtime Environment for Wireless™ (BREW®) software platform developed by QUALCOMM, Inc., of San Diego, Calif. In the following description, it will be assumed that one embodiment of the application priority system is implemented using a wireless device that is executing a runtime environment, such as the BREW software platform. However, one or more embodiments of the application priority system are suitable for use with other types of runtime environments to dynamically allocate the top visible resource on wired and wireless devices. Furthermore, the term "top visible resource" is use herein to describe any type of hardware and/or software resource on a device that is used to represent the current focus of the device, including but not limited to, the combination of a device display and keypad.

Figure 1:
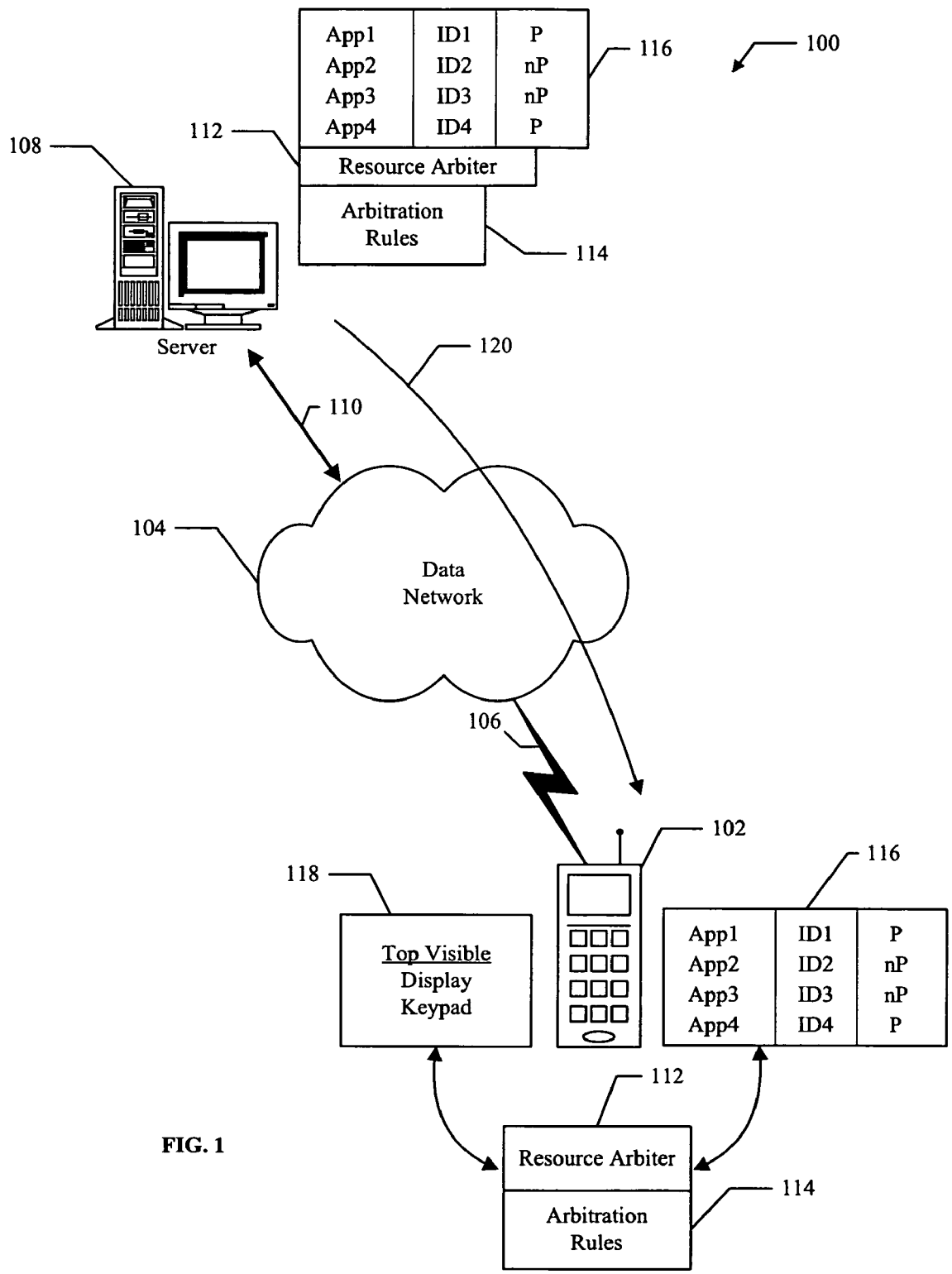
FIG. 1 shows one embodiment of a dynamic application priority system that operates to allocate a top visible resource on a device.

FIG. 1 shows one embodiment of a dynamic application priority system 100 that operates to allocate a top visible resource on a device. The system 100 comprises a wireless terminal 102 that communicates with a data network 104 via a wireless communication channel 106. The data network 104 comprises any type of data network that may include, but is not limited to, a wired, wireless, private, or public data network, or any combination thereof.

The system 100 also comprises a server 108 that is coupled to the network 104 via a communication channel 110 to provide services to devices in communication with the network 104. For example, the wireless terminal 102 may be a wireless telephone, and the server 108 may be part of a nationwide telecommunications network that provides telecommunication services to the telephone. The communication channel 110 may be any type of wired or wireless communication channel.

The device 102 includes applications 116 that execute on the device to provide features and functions desirable by the device user. For example, the applications 116 may be downloaded to the device 102 from the server 108 as shown by path 120. During execution, the applications 116 attempt to gain access to the top visible resource 118 of the device 102, which in one embodiment comprises a device display and keypad.

In one embodiment, the applications 116 each have one or more group IDs that indicate the rights and privileges of an application. For example, a group ID identifies whether an application is Privileged (P) or non-Privileged (nP) with respect to the top visible resource. In one embodiment, both privileged and non-privileged applications may access the top visible resource, however, privileged applications are allowed to specify selected applications or groups to which control of the top visible resource will be relinquished.

In one embodiment, the device 102 comprises an arbiter 112 and arbitration rules 114. For example, the arbiter 112 and the arbitration rules 114 may be downloaded to the device 102 from the server 108, as shown by path 120. The arbiter 112 operates to arbitrate requests for the top visible resource 118 from competing applications executing on the device 102. The arbiter 112 decides the arbitration requests based on information about the requesting application and the resource owning application. In one embodiment, the privilege status of the owning application and the arbitration rules 114 are used to produce an arbitration decision that indicates how to allocate the top visible resource 118 to the competing applications. Thus, by associating a particular privilege status to a selected application and downloading a particular set of arbitration rules 114 from the server 108 to the device 102, it is possible for the server 108 to control how the top visible resource 118 on the device is allocated to the applications 116. This allows the server 108 to control the user experience provided by the device 102.

In one or more embodiments, the server 108 and the terminal 102 may be any type of devices and their associated connections to the data network 104 may be wireless, wired, or any combination thereof. Thus, embodiments of the dynamic application priority system operate to allow a server to control how the top visible resource on a device is allocated using virtually any network configuration having a variety of servers and terminals.

Figure 2:
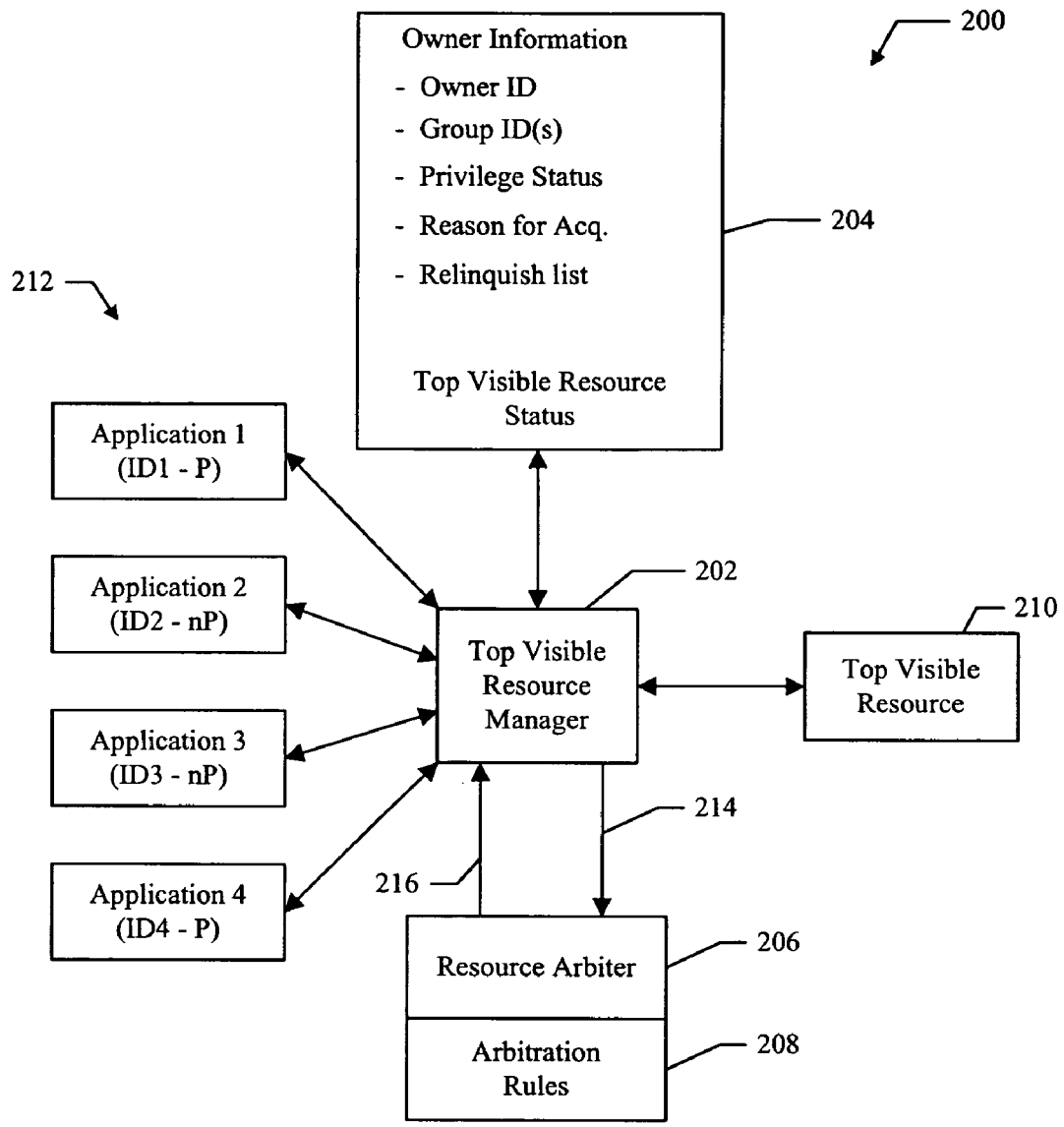
FIG. 2 shows a functional diagram of one embodiment of an application priority system for allocating the top visible resource in a device, for example, the device shown in FIG. 1.

FIG. 2 shows a functional diagram of one embodiment of an application priority system 200 for allocating the top visible resource in a device, for example, the device 102 shown in FIG. 1. The system 200 comprises a top visible resource manager 202, top visible resource status 204, a resource arbiter 206, and arbitration rules 208. Also shown are the top visible resource 210 of the device and applications (1-4) that execute on the device, which are generally shown at 212.

The top visible resource manager 202 comprises hardware logic, software logic, or any combination thereof, and operates to manage the top visible resource 210. The top visible resource 210 may comprise any type of device resource, such as a display and keypad, which are used to represent to a user which application has the focus of the device. For example, the application that has the focus of the device is the application that is currently interacting with the user.

The top visible resource status 204 comprises hardware, software or any combination thereof. In one embodiment, the top visible resource status 204 comprises information about the top visible resource 210 and/or information about the current resource owner (owner information). For example, an application that is currently allocated the top visible resource 210 is considered to be the resource owner, current owner, or owning application. For example, in one embodiment, the top visible resource status 204 comprises information about the current owner that comprises a current owner identifier (ID), one or more Group IDs, privilege status, reason for acquiring the resource, a relinquish list, and/or any other information about the current owner or the top visible resource 210. In one embodiment, the relinquish list identifies what applications or groups (i.e., privilege classes) the current owner is willing to release the top visible resource 210 to. In one embodiment, this list is controlling during the arbitration process conducted by the resource arbiter 206. In another embodiment, this relinquish list is considered to be only a recommendation to the resource arbiter 206 as to how arbitrations should be decided. The top visible resource manager 202 operates to maintain, update, change, add, delete, or otherwise process the information that is comprised in the resource status 204.

The resource arbiter 206 comprises hardware, software or any combination thereof, and operates to arbitrate access to the top visible resource 210 using the arbitration rules 208. For example, in one embodiment, the resource arbiter 206 may be a program module and the arbitration rules 208 may be parameters stored in a memory that are retrieved by the resource arbiter 206 and processed to dynamically allocate the top visible resource 210. In one or more embodiments, the top visible resource manager 202 and the resource arbiter 206 may be implemented as downloadable extensions to the runtime environment executing on the device; for example, they may be downloadable BREW extensions.

During operation of one embodiment of the dynamic application priority system 200, an application submits an allocation request to the top visible resource manager 202 for access to the top visible resource 210. If the top visible resource 210 is available, the top visible resource manager 202 allocates the top visible resource 210 to the requesting application. If the top visible resource 210 is currently owned by another application, the top visible resource manager 202 responds by assembling an arbitration request that comprises information about the requesting application (requester information) and information about the current owner of the resource (owner information). Information about the requesting application is derived from the allocation request, and information about the current owner of the resource is derived from the top visible resource status 204. The arbitration request is sent to the resource arbiter 206, as shown at 214. The resource arbiter 206 processes the arbitration request using the arbitration rules 208 to produce an arbitration decision that is sent back to the top visible resource manager 202, as shown at 216. The top visible resource manager 202 then operates to allocate the top visible resource 210 to the appropriate application according to the arbitration decision.

In one embodiment, the applications 212 have a group ID that determines whether a particular application is privileged with respect to the top visible resource 210. For example, a group ID is associated with a set of rights that apply to all applications having that group ID. One of the rights defines the privilege status of the application with respect to the top visible resource 210. When an application first obtains access to the top visible resource 210, it provides information to the top visible resource manager 202 (via the allocation request) that includes its application ID, one or more group ID, and a reason for wanting access to the top visible resource 210. In one embodiment the group ID is not passed because it can be inferred from the application ID. In one embodiment, the reason for wanting access to the top visible resource 210 is selected from one of several enumerated types. However, the set of reasons is not limited to an enumerated list, but can also be associated with a Group ID or other custom reasons.

If the application is privileged, as determined from its group ID, it may restrict what applications can take the top visible resource 210 away. For example, the application may specify a relinquish list that identifies applications to which the top visible resource 210 will be relinquished. For example, the applications in the relinquish list may be identified by one or more of their group IDs.

When another application requests access to the top visible resource 210, the top visible resource manager 202 generates an arbitration request that includes information about the current resource owner (owner information) and information about the requesting application (requester information). As part of the arbitration request, the privilege status of the top visible resource 210 owner and requester are passed to the resource arbiter 206 along with their associated reasons for wanting the top visible resource 210 and any relinquish list. The information passed to the resource arbiter 206 may also comprise any other parameters or criteria. For example, the information passed to the resource arbiter 206 may include user preferences, current device operating mode, carrier preferences, or any other type of information that may be used to arbitrate the request. The resource arbiter 206 then uses this information to determine how the top visible resource 210 is to be allocated.

In one embodiment, the current top visible resource 210 owner may dynamically change its application priority with respect to the top visible resource 210. For example, after initial access to the top visible resource 210, where other applications may be restricted from access, the application may change its relinquish list and thereby allow other applications to obtain access to the top visible resource 210. Thus, the system operates to provide flexibility by allowing the application that owns the top visible resource 210 to either release the top visible resource 210, or make the top visible resource 210 easier for other applications to access.

In another embodiment, the system provides a callback mechanism that allows an application to register a callback function. The callback function allows the system to notify the application when there is a change of status of the top visible resource 210. For example, the callback function can be used to notify an application when the top visible resource 210 is free, or when the top visible resource 210 becomes busy because it is allocated to another application. Thus, the system 200 operates to provide a dynamic application priority system to allocate access to the top visible resource 210 of a device to a particular application.

To further adjust to changing operating environments, the resource arbiter 206 and arbitration rules 208 may be downloaded to the device from a network entity, thereby allowing a third party to have input as to how the top visible resource 210 is allocated on the device. For example, in one embodiment, the device is a wireless telephone and the resource arbiter 206 and arbitration rules 208 are downloaded to the device from a network server that is part of a nationwide telecommunication carrier network. In this way, the telecommunication carrier is provided an input as to how the top visible resource 210 is allocated between applications on the device, and is thereby able to control the user experience provide by the device.

Figure 3:
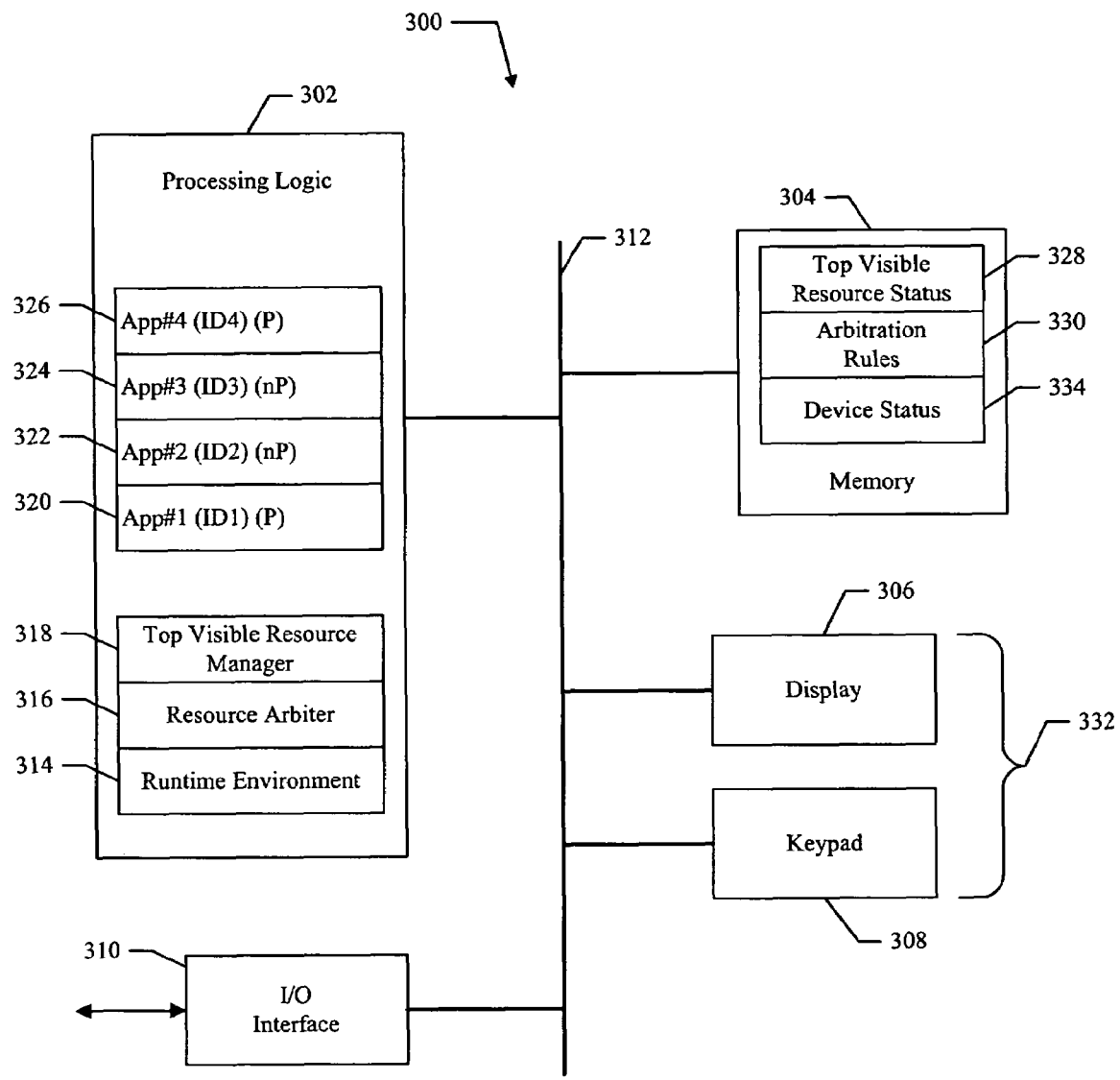
FIG. 3 shows one embodiment of a device that includes one embodiment of an application priority system.

FIG. 3 shows one embodiment of a device 300 that includes one embodiment of an application priority system. The device 300 comprises processing logic 302, memory 304, display logic 306, keypad logic 308, and I/O interface 310 all coupled to an internal data bus 312. For the purpose of clarity, it will be assumed that a top visible resource 332 on the device 300 comprises the display logic 306 and the keypad logic 308. It should be noted that one or more embodiments of the application priority system are suitable for use with other devices having different configurations, and that it is possible to define the top visible resource 332 using different functional elements.

The processing logic 302 comprises a CPU, processor, gate array, discrete logic, or other hardware or software, or any combination thereof. Thus, the processing logic 302 generally comprises logic to execute machine-readable instructions to perform the functions described herein. For example, instructions may be loaded into the device 300 from a computer-readable media, such as a floppy disk, CDROM, Flash memory, or other computer-readable media that interfaces with the device 300 via the interface 310. In another embodiment, the instructions may be downloaded into the device 300 from a network resource, such as a network server or any other type of network resource via the interface 310. The instructions, when executed by the processing logic 302 provide one or more embodiments of an application priority system as described herein.

The memory 304 comprises any type of RAM, ROM, hard disk, floppy disk, Flash memory, or any other type of memory device. The display logic 306 comprises logic to control a display device, such as a CRT, LCD or any other type of display device. The keypad logic 308 comprises logic to control a user input device, such as a keypad, pen, joystick or any other type of user input device, to receive user input. The I/O interface 310 comprises hardware and/or software or any combination thereof to allow the device 300 to interface with external devices or systems. For example, the I/O interface 310 comprises logic to interface to external storage systems, such as disk drives or other memory devices. The interface 310 also comprises logic to interface to an external system, such as a local computer system. In addition, the interface also comprises logic to interface with data network allowing communication with remote computers and servers.

During operation of the device, program instructions executed by the processing logic 302 activate a runtime environment 314. For example, the runtime environment may be the BREW runtime environment. Program instructions executed by the processing logic 302 also activate a top visible resource manager 318. The top visible resource manager 318 operates to control access to the top visible resource 332 to allow applications to control the display resource 306 and the keypad resource 308. Thus, the top visible resource manager 318 operates to control access to the top visible resource 332 (display 306 and keypad 308) to allow applications to interact with the device user.

The top visible resource manager 318 receives requests to access the top visible resource 332 from applications (320, 322, 324, 326) running on the device 300. The applications (320, 322, 324, 326) may be any type of applications suitable for execution on the device 300. For example, the applications may be multimedia applications, calendar applications, email applications, voice processing applications, or any other type of applications which when executed on the device 300 provide useful features and/or functions. To facilitate the allocation of the top visible resource 332, the top visible resource manager 318 maintains top visible resource status 328 in the memory 304. The device status 334 identifies the current operating mode of the device, for example, the device operating mode may be idle, running an application, receiving a message, processing a voice call, playing a game, or be in any other type of device operating mode.

As the applications (320, 322, 324, 326) execute on the device 300, they submit requests to the top visible resource manager 318 to access the top visible resource 332. In the case where the top visible resource 332 is currently unallocated, the top visible resource 332 may be easily allocated to a requesting application. However, if the top visible resource 332 is currently allocated to one application, any request to access the top visible resource 332 from another application needs to be arbitrated to determine which application will be allocated the top visible resource 332.

In one or more embodiments, the application priority system operates to arbitrate the allocation of the top visible resource 332 to one of the applications executing on the device. For example, if the top visible resource 332 is currently allocated to an application, the top visible resource manager 318 submits an arbitration request to the resource arbiter 316. The request includes information about the requesting application (requester information) and information about the current owner (owner information) of the top visible resource 332. For example, information about the current owner of the top visible resource 332 is maintained in the top visible resource status 328.

In one embodiment, the resource arbiter 316 processes the arbitration request according to arbitration rules 330 stored in the memory 304. For example, in one embodiment, the arbitration rules 330 are downloaded to the device 300 from a network server so that the network server is able to provide input as to how resource requests are arbitrated in the device 300. The arbitration request is processed by the resource arbiter 316 to produce an arbitration decision that is returned to the top visible resource manager 318. The top visible resource manager 318 then allocates the resource based on the arbitration decision.

It should be noted that the description of the application priority system shown in the device 300 illustrates just one embodiment, and that other configurations are possible to provide the functions described herein. For example, it is possible that the functional elements of the device 300 be combined, rearranged, changed, added to, or deleted within the scope of the described embodiments.

Resource Arbiter

In one or more embodiments, the resource arbiter 316 operates as the central decision maker to determine if the top visible resource 332 can be handed over to a requesting application (or object). In one embodiment, the resource arbiter 316 is installed on the device during manufacture. In another embodiment, the resource arbiter 316 is customizable by a network server and is implemented as a downloadable module that may be updated or replaced as desired. For example, in an implementation where the device is a wireless telephone, the resource arbiter 316 may be customized and downloaded to the telephone from a network server operated by a communications OEM/carrier. Preferably, a single resource arbiter 316 is used to arbitrate requests for the top visible resource 332 on a device.

In one embodiment, the resource arbiter 316 is passed a variety of information from the top visible resource manager 318, and that information is used to produce an arbitration decision. In one embodiment, the information that is passed to the resource arbiter 316 comprises information about the requesting application (requester information) and information about the current owner of the top visible resource 332 (owner information). However, in other embodiments, additional types of information are passed to the resource arbiter 316 and this additional information comprises device status information 334, user preference information, third party preference information, and any other type of information suitable for use by the resource arbiter to produce an arbitration decision.

Additionally, in one embodiment, the resource arbiter 316 is extensible so that the arbitration process may be modified to use different information items during different time periods or operating conditions to render an arbitration decision. The following represents a brief description of the requester and owner information that may be passed to the resource arbiter 316 in order to produce an arbitration decision, however, the information that may be passed to the resource arbiter is not limited to the list shown.

A. Resource Owner Information
   1. Owner class identifier (CLSID) and instance pointer
   2. Reason for acquisition of the TVR
   3. Relinquish control information
      a. Relinquish Identifier List
      b. List count (−1=all, 0=none, otherwise count)

B. Requester Information
   1. Requester class identifier (CLSID) and instance pointer
   2. Reason for acquisition of the TVR
   3. Relinquish control information
      a. Relinquish Identifier List
      b. List count (−1=all, 0=none, otherwise count)

Figure 4:
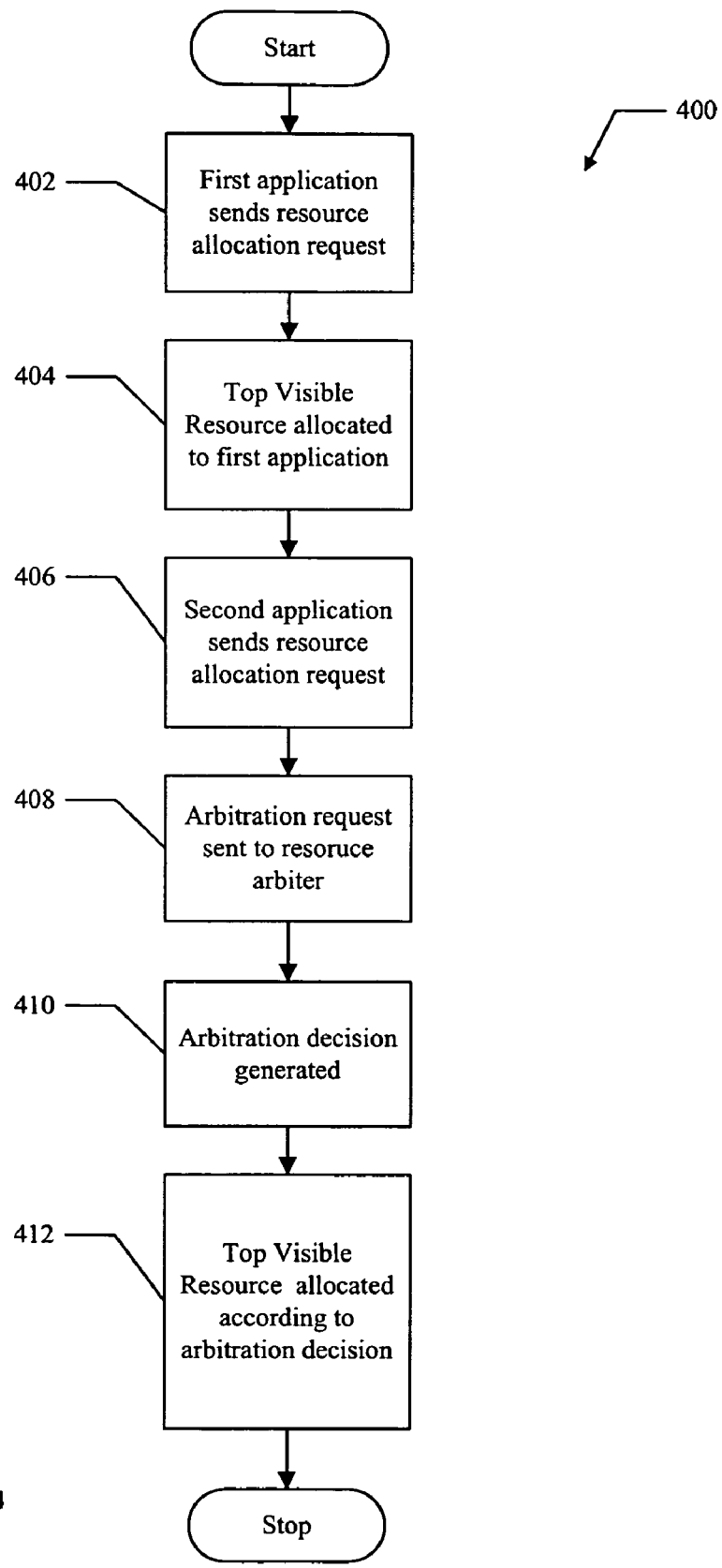
FIG. 4 shows one embodiment of a method for providing one embodiment of an application priority system for use in a device.

FIG. 4 shows one embodiment of a method 400 for providing one embodiment of an application priority system for use in a device. For the purpose of clarity, the operation of the method 400 will be described with reference to the device 300 shown in FIG. 3. For example, the method 400 shows how in one embodiment, the top visible resource 332 (display 306 and keypad 308) is dynamically allocated to one of the applications 320, 322, 324, and 326.

At block 402, a first application sends a resource allocation request to the top visible resource manager 318 associated with the top visible resource 332. For example, application 320 sends a resource allocation request to the top visible resource manager 318 to request allocation of the top visible resource 332. The allocation request includes information about the application 320; for example, the allocation request includes requester information as described above.

At block 404, the top visible resource manager 318 allocates the top visible resource 332 to the first application. For example, the top visible manager 318 allocates the top visible resource to the application 320. Additionally, the top visible resource manager 318 uses the requester information provided in the allocation request to update the owner information described above. The resource owner information is then stored in the top visible resource status 328.

At block 406, a second application sends a resource allocation request to the top visible resource manager 318 associated with the top visible resource 332. For example, application 322 sends a resource allocation request to the top visible resource manager 318 to request allocation of the top visible resource 332. The allocation request includes information about the application 322; for example, the allocation request includes requester information as described above.

At block 408, the top visible resource manager 318 sends an arbitration request to the resource arbiter 316. For example, the top visible resource manager 318 sends an arbitration request to the resource arbiter 316. The arbitration request includes resource owner information from the top visible resource status 328 and requester information from the allocation request. Thus, arbitration request provides the resource arbiter 316 with information about the current owner and current requester of the top visible resource 332.

At block 410, the resource arbiter 316 generates an arbitration decision that indicates which application should be allocated the top visible resource 332. For example, the resource arbiter 316 generates the arbitration decision and transmits the decision to the top visible resource manager 318. The resource arbiter 316 generates the arbitration decision based on the arbitration rules 330 stored in the memory 304. In one embodiment, the resource arbiter 316 and the arbitration rules 330 are downloaded from a third party, such as an OEM/carrier, which allows updating and also provides a mechanism for the third party to decide how the top visible resource 332 is allocated on the device. A more detailed description of how the resource arbiter 316 generates the arbitration decision is provided in another section of this document.

At block 412, the top visible manager 318 allocates the top visible resource 332 based on the arbitration decision. For example, the top visible resource manager 318 allocates the top visible resource 332 to either the first application 320 or the second application 322 based on the arbitration decision. The top visible resource manager 318 also updates the top visible resource status 328 with any new resource owner information.

Thus, the method 400 operates to provide one embodiment of a dynamic application priority system for use in a device. It should be noted that the method 400 illustrates just one embodiment and that it is possible to rearrange, change, combine, add, or delete method steps within the scope of the described embodiments. For example, it is possible for an application to register a callback function with the top visible resource manager 318 so that the status and/or availability of the top visible resource 332 can be provided to the application as desired. Thus, it is possible that additional ancillary functions be provided by the application priority system and that these ancillary functions are within the scope of the described embodiments.

Figure 5:
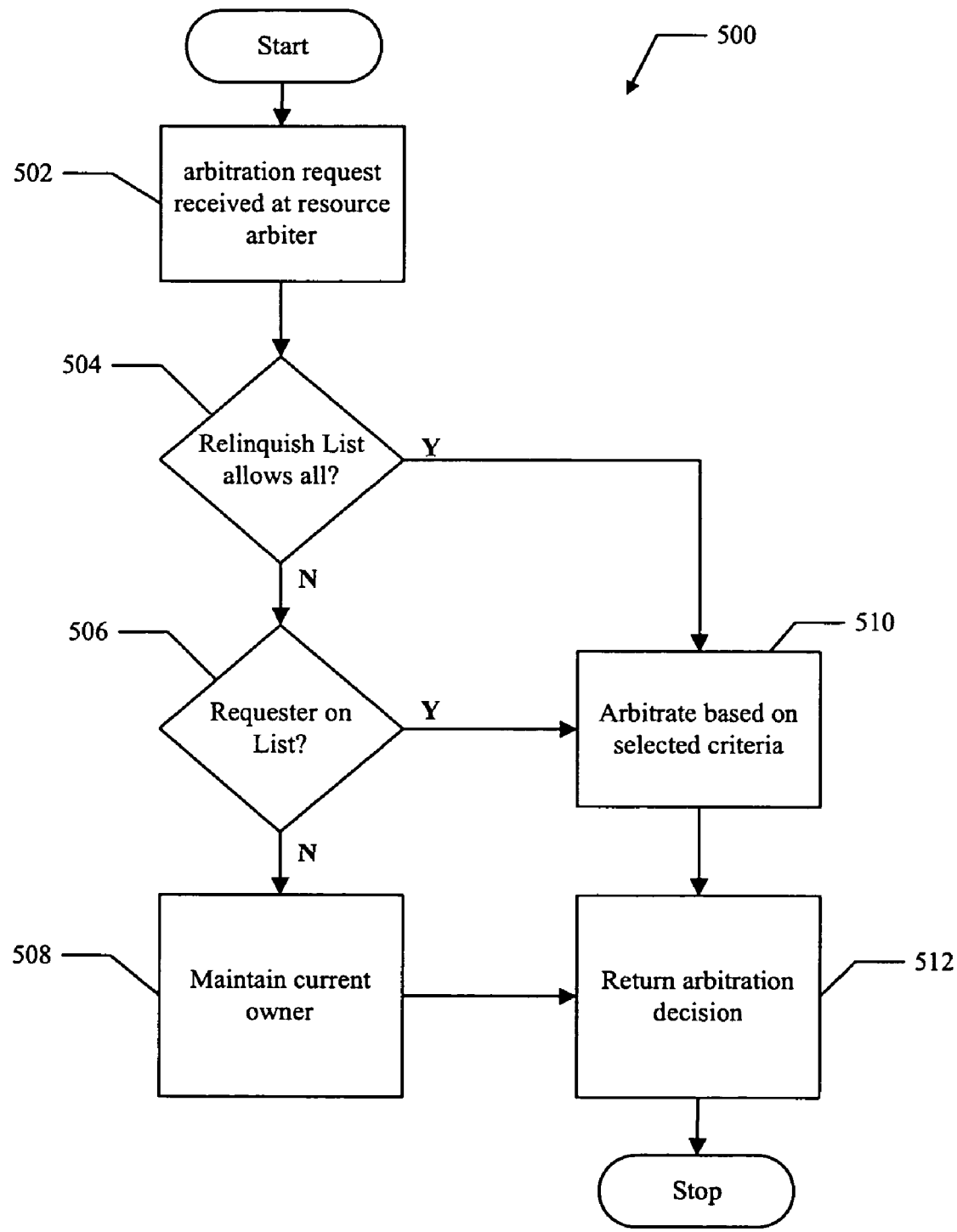
FIG. 5 shows one embodiment of a method for operating a resource arbiter to provide one embodiment of an application priority system.

FIG. 5 shows one embodiment of a method 500 for operating a resource arbiter to provide one embodiment of an application priority system. For the purpose of clarity, the operation of the method 500 will be described with reference to the device 300 shown in FIG. 3. Thus, in one embodiment, the method 500 is implemented by the resource arbiter 316 shown in FIG. 3.

At block 502, an arbitration request is received at the resource arbiter 316. For example, the top visible resource manager 318 submits the arbitration request to the resource arbiter 316. The arbitration request comprises information about the current owner (owner information) of the top visible resource 332, and information about the application requesting (requester information) access to the top visible resource 332.

At block 504, a test is performed on the relinquish list provided by the current owner of the top visible resource 332 to determine to which applications the current owner will relinquish control of the top visible resource 332. The relinquish list is part of the current owner information provided in the arbitration request. If the relinquish list specifies that any application can obtain the top visible resource 332, the method proceeds to block 510. If the relinquish list specifies that either no applications or only specific applications can obtain control the top visible resource 332, the method proceeds to block 506.

At block 506, a test is performed to determine if the requesting application is one of the applications identified in the relinquish list. For example, the relinquish list specifies group IDs or application IDs that can be used to identify selected applications. If the identifier of the requesting application is specified in the relinquish list, the method proceeds to block 510. If the identifier of the requesting application is not specified in the relinquish list, the method proceeds to block 508.

At block 508, an arbitration decision is made to maintain the current owner of the top visible resource 332. Because the current owner is privileged and the requesting application is not on the relinquish list, the request for allocation of the top visible resource 332 by the requesting application is denied. The method then proceeds to block 512 where the arbitration decision is returned to the top visible resource manager 318.

At block 510, the arbitration request from the requesting application is arbitrated based on selected criteria. For example, in one embodiment, the request is arbitrated based on the arbitration rules 330. Virtually any criteria can be used to determine which application will be allocated the top visible resource 332. For example, the arbitration may be based on the reason each application wants the top visible resource 332, the operating mode of the device, user preferences, carrier (third party) preferences, or any other criteria.

Implementation Example

The following describes an implementation example of one embodiment of an application priority system that operates to allocate a top visible resource in a device. In one embodiment, the system comprises a top visible resource manager that provides a means for applications (objects), including BREW applications, to control resource access. The top visible resource manager also coordinates and manages the acquisition and freeing of the top visible resource by objects and also operates to notify registered objects when the state of the top visible resource changes.

In one embodiment, an OEM or carrier implements a set of arbitration rules that are used to determine if the current application can be suspended or placed in a background mode in order to start a new application, given the current state of the device. For example, if the device is a wireless telephone that is in a voice call, the OEM may define the arbitration rules so as to prevent another application from obtaining access to the top visible resource and thereby disrupt the call.

Figure 6:
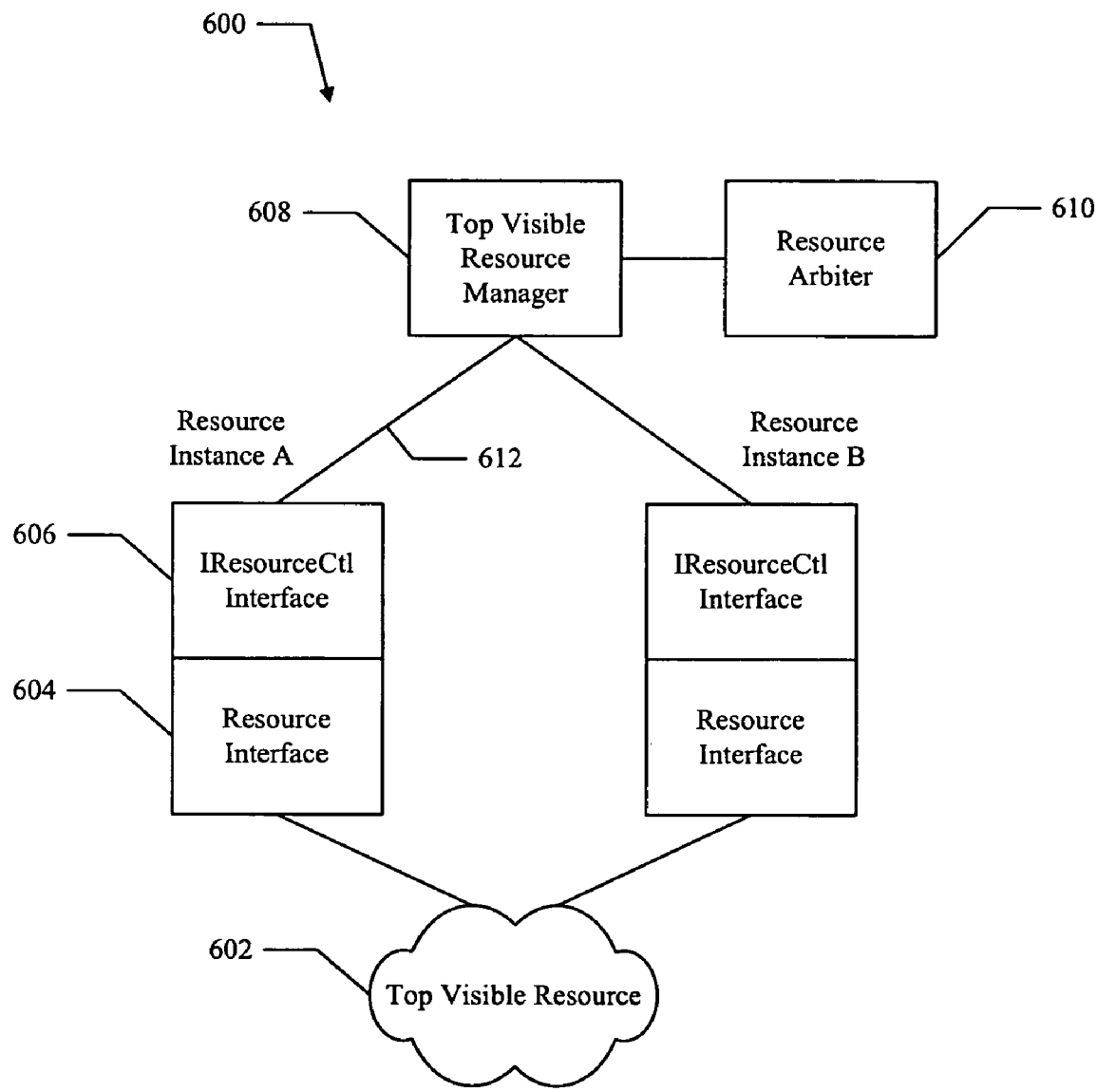
FIG. 6 shows one embodiment of a resource control architecture suitable for use with one or more embodiments of an application priority system.

FIG. 6 shows one embodiment of a resource control architecture 600 suitable for use with one or more embodiments of an application priority system. For each Top Visible Resource 602 being managed, there is a Resource Interface 604 that controls the object, an IResourceCtl Interface 606 for controlling access, and a Top Visible Resource Manager 608. Additionally, a Resource Arbiter 610 is provided to arbitrate access to the Top Visible Resource 602.

When an instance of the Resource Interface 604 is created, it includes the IResourceCtl instance 612. The IResourceCtl Instance 612 interacts with the Top Visible Resource Manager 608 to acquire and free the underlying Top Visible Resource 602. It should be noted that even if one application has control of the Top Visible Resource 602, another application could take control of the same Top Visible Resource 602 at any time based on the existing arbitration rules.

Figure 7:
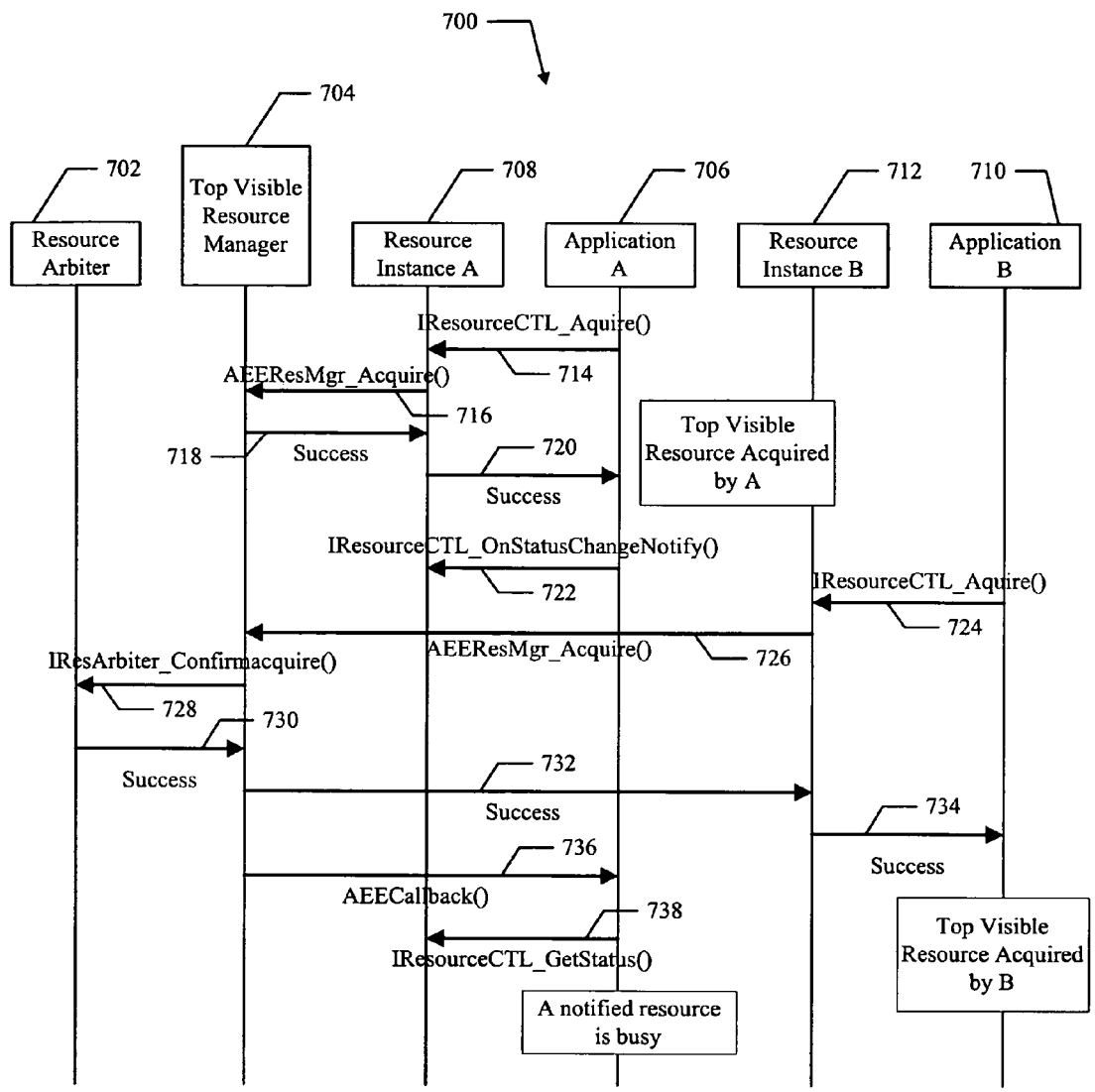
FIG. 7 shows an example of how the top visible resource in a device is allocated between two applications in accordance with one or more embodiments of an application priority system.

FIG. 7 shows a diagram 700 that illustrates an allocation example that describes how a top visible resource in a device is allocated between two applications in accordance with one or more embodiments of a dynamic arbitration system. For example, the diagram 700 shows the interaction between various device entities comprising a Resource Arbiter 702, Top Visible Resource Manager 704, Application A 706, Resource Instance A 708, Application B 712, and Resource Instance B 714.

In the beginning of the allocation example, Application A 706 issues a resource request 714 to Resource Instance A 708 to acquire access to a top visible device resource managed by the Top Visible Resource Manager 704. The resource request is forwarded from Resource Instance A 708 to the Top Visible Resource Manager 704, as shown by 716. It will be assumed that at this point in time the top visible resource is unallocated, so that the Top Visible Resource Manager 704 allocates the top visible resource to the Application A 706 and issues a "success" indicator that flows back to the Application A 708, which is shown at 718 and 720. At this point, the top visible resource has been acquired by the Application A 708. Additionally, the Application A 706 registers a callback function with the Resource Instance A 708 to receive information about any status changes with regards to the top visible resource, as shown at 722.

Later, Application B 710 issues a resource request 724 to the Resource Instance B 712 to acquire the top visible resource managed by the Top visible Resource Manager 704. The resource request is forwarded from Resource Instance B 712 to the Top Visible Resource Manager 704, as shown by 726. The request from Application B 710 causes the Top Visible Resource Manager 704 to request arbitration from the Resource Arbiter 702, as shown at 728. The Resource Arbiter 702 processes the arbitration request 730 in accordance with the embodiments described herein. The Resource Arbiter 702 provides an arbitration result that indicates that the top visible resource was successfully allocated to Application B 710, as shown by 730, 732, and 734. Therefore, at this point, Application B 710 has acquired the top visible resource. Because the Application A 706 registered for status change notifications (at 722), Application A 706 is alerted via a callback function 736 because the status of the top visible resource has changed. Thus, in response to the callback, the Application A 706 issues a "get status" command 738 that returns a notification that the top visible resource has been allocated to another application and is now busy.

Customizing the Resource Arbiter

The resource arbiter is the central decision maker that determines if the top visible resource can be handed over to the requesting object. The resource arbiter module is customizable by the OEM/Carrier and may be implemented as a downloadable module using a class identifier (CLSID). In one embodiment, there is a single resource arbiter (IResArbiter) implementation for the top visible resource. In one embodiment, the resource arbiter method, IResArbiter_ConfirmAcquire, is passed the Resource owner's information and the requester information as described above in order to produce the arbitration decision.

If the current owner has specified a relinquish CLSID list, and the requester is identified in the list of application IDs or group IDs specified in the relinquish list, or if the owner allows any ID (as in the case of a non-privileged owner), then the resource arbiter may decide to transfer ownership based on the rest of the information provided (the simplest implementation grants the request). If the requester is not identified on the relinquish CLSID list, the resource arbiter rejects the request. The following is a sample implementation of the ConfirmAcquire method for the resource arbiter suitable for use in a device executing a BREW runtime environment.

```
int OEMResArbiter_ConfirmAcquire(IResArbiter * po, AEECLSID
    clsReq,AEEResCtlInfo * pOwner, AEEResCtlInfo * pRequester)
{
    CResArbiter * pMe = (CResArbiter*)po;
    int status = EITEMBUSY;
    int i;
    //
    // first check class list to see if owner will allow it
    //
    switch (pOwner->nClsCount)
    {
    case -1:     // allow anyone to acquire resource
        status = SUCCESS;
        break;
    case 0:      // allow no one to acquire resource
        status = EITEMBUSY;
        break;
    default:     // check access (relinquish) list
        for (i=0;i<pOwner->nClsCount;i++)
        {
            uint32 privId = pOwner->pClsList[i];
            if (privId < QVERSION)
            {
                // is reason acceptable?
                if (privId == pRequester->dwReason)
                {
                    status = SUCCESS;
                    break;
                }
            }
            else
            {
                // does requester class id match or has group
                privilege?
                if (ISHELL_CheckPrivLevel
                (pMe->m_pIShell,privId,TRUE))
                {
                    status = SUCCESS;
                    break;
                }
            }
        }
        break;
    }
    // At this point, an OEM may choose to accept the access list
    // permission checks and/or add additional decision algorithms
    such
    // as examining the current reason for access or allowing specific
    // requester CLSID's regardless of the owner's access list, etc.
    // BREW sets the dwReason to RESCTL_REASON_BUSY if the current
    // application responds to EVT_BUSY.
        if (pOwner->dwReason == RESCTL_REASON_BUSY
        && clsReq ==
            AEECLSID_TOPVISIBLECTL)
            status = EITEMBUSY;
        return (status);
    }
```

Accordingly, while one or more embodiments of an application priority system for use in a device have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

We claim:

1. A method operating on a device for allocating a top visible resource on the device, the method comprising:

storing a relinquish list for a privileged application on the device, wherein the privileged application is allowed to specify in the relinquish list an application identifier or a group identifier corresponding to an application to which the privileged application will relinquish control of the top visible resource;

receiving a request requesting allocation of the top visible resource to a requesting application;

determining that the top visible resource is allocated to an owning application;

associating owner information with requester information to form an arbitration request, wherein the owner information comprises information about the owning application and the requester information comprises information about the requesting application;

downloading a resource arbiter to the device;

arbitrating the arbitration request at the resource arbiter to produce an arbitration decision that indicates that the top visible resource is to be allocated to the requesting application if the owner information indicates that the owning application corresponds to the privileged application, and an identifier that identifies the requesting application corresponds to the application identifier or the group identifier in the relinquish list, wherein the step of arbitrating comprises arbitrating the arbitration request to produce an arbitration decision based on any information selected from a set of information items comprising the owner information, the requester information, device status information, device operating mode information, user preference information, and third party preference information; and allocating the top visible resource based on the arbitration decision.

2. The method of claim 1, wherein the step of arbitrating comprises arbitrating the arbitration request to produce an arbitration decision that indicates that the top visible resource is to be allocated to the owning application if the owner information indicates that the owning application is the privileged application, and the identifier that identifies the requesting application is not contained in the relinquish list associated with the owner information.

3. The method of claim 1, wherein the step of arbitrating comprises arbitrating the arbitration request to produce the arbitration decision that indicates that the top visible resource is to be allocated to one of the owning application and the requesting application based on at least one parameter contained in the owner information.

4. The method of claim 1, wherein the device is a wireless device.

5. Apparatus for dynamically allocating a top visible resource on a device, the apparatus comprising:

a processor comprising:

logic to store a relinquish list for a privileged application, wherein the privileged application is allowed to specify in the relinquish list an application identifier or a group identifier corresponding to an application to which the privileged application will relinquish control of the top visible resource;

logic to receive a request requesting allocation of the top visible resource to a requesting application;

logic to determine that the top visible resource is allocated to an owning application; and logic to associate owner information with requester information to form an arbitration request, wherein the owner information comprises information about the owning application and the requester information comprises information about the requesting application;

logic to download a resource arbiter to the device;

the resource arbiter that operates to arbitrate the arbitration request to produce an arbitration decision that indicates that the top visible resource is to be allocated to the requesting application if the owner information indicates that the owning application corresponds to the privileged application, and an identifier that identifies the requesting application corresponds to the application identifier or the group identifier in the relinquish list, wherein the arbitration decision is based on any information selected from a set of information items comprising the owner information, the requester information, device status information, device operating mode information, user preference information, and third party preference information; and logic to allocate the top visible resource based on the arbitration decision.

6. The apparatus of claim 5, wherein the resource arbiter operates to arbitrate the arbitration request to produce an arbitration decision that indicates that the top visible resource is to be allocated to the owning application if the owner information indicates that the owning application is the privileged application, and the identifier that identifies the requesting application is not contained in the relinquish list associated with the owner information.

7. The apparatus of claim 5, wherein the resource arbiter operates to arbitrate the arbitration request to produce an arbitration decision that indicates that the top visible resource is to be allocated to one of the owning application and the requesting application based on at least one parameter contained in the owner information.

8. The apparatus of claim 5, wherein the device is a wireless device.

9. Apparatus for allocating a top visible resource on a device, the apparatus comprising:

a computer-readable medium, storing:

means for storing a relinquish list for a privileged application, wherein the privileged application is allowed to specify in the relinquish list an application identifier or a group identifier corresponding to an application to which the privileged application will relinquish control of the top visible resource;

means for receiving a request requesting allocation of the top visible resource to a requesting application;

means for determining that the top visible resource is allocated to an owning application;

means for associating owner information with requester information to form an arbitration request, wherein the owner information comprises information about the owning application and the requester information comprises information about the requesting application;

means for downloading a resource arbiter to the device;

means for arbitrating the arbitration request at the resource arbiter to produce an arbitration decision that indicates that the top visible resource is to be allocated to the requesting application if the owner information indicates that the owning application corresponds to the privileged application, and an identifier that identifies the requesting application corresponds to the application identifier or the group identifier in the relinquish list, wherein the arbitration decision is based on any information selected from a set of information items comprising the owner information, the requester information, device status information, device operating mode information, user preference information, and third party preference information; and means for allocating the top visible resource based on the arbitration decision.

10. The apparatus of claim 9, wherein the means for arbitrating comprises means for arbitrating the arbitration request to produce an arbitration decision that indicates that the top visible resource is to be allocated to the owning application if the owner information indicates that the owning application is the privileged application, and the identifier that identifies the requesting application is not contained in the relinquish list associated with the owner information.

11. The apparatus of claim 9, wherein the means for arbitrating comprises means for arbitrating the arbitration request to produce an arbitration decision that indicates that the top visible resource is to be allocated to one of the owning application and the requesting application based on at least one parameter contained in the owner information.

12. The apparatus of claim 9, wherein the device is a wireless device.

13. A computer-readable media comprising instructions, which when executed by a processor in a device, operate to allocate a top visible resource on a device, the computer-readable media comprising:

instructions for storing a relinquish list for a privileged application, wherein the privileged application is allowed to specify in the relinquish list an application identifier or a group identifier corresponding to an application to which the privileged application will relinquish control of the top visible resource;

instructions for receiving a request requesting allocation of the top visible resource to a requesting application;

instructions for determining that the top visible resource is allocated to an owning application;

instructions for associating owner information with requester information to form an arbitration request, wherein the owner information comprises information about the owning application and the requester information comprises information about the requesting application;

instructions for downloading a resource arbiter to the device;

instructions for arbitrating the arbitration request at the resource arbiter to produce an arbitration decision that indicates that the top visible resource is to be allocated to the requesting application if the owner information indicates that the owning application corresponds to the privileged application, and an identifier that identifies the requesting application corresponds to the application identifier or the group identifier in the relinquish list, wherein the arbitration decision is based on any information selected from a set of information items comprising the owner information, the requester information, device status information, device operating mode information, user preference information, and third party preference information; and instructions for allocating the top visible resource based on the arbitration decision.

14. The computer-readable media of claim 13, wherein the instructions for arbitrating comprise instructions for arbitrating the arbitration request to produce an arbitration decision that indicates that the top visible resource is to be allocated to the owning application if the owner information indicates that the owning application is the privileged application, and the identifier that identifies the requesting application is not contained in the relinquish list associated with the owner information.

15. The computer-readable media of claim 13, wherein the instructions for arbitrating comprise instructions for arbitrating the arbitration request to produce an arbitration decision that indicates that the top visible resource is to be allocated to one of the owning application and the requesting application based on at least one parameter contained in the owner information.

16. The computer-readable media of claim 13, wherein the device is a wireless device.

17. A method operating on a device to allocate a top visible resource on the device, comprising:
    storing a relinquish list on the device for an application identified as privileged, wherein the application identified as privileged is allowed to specify in the relinquish list an application identifier or a group identifier corresponding to an identified application to which the application identified as privileged will relinquish control of the top visible resource;
    receiving an allocation request for access to the top visible resource from a requesting application;
    determining that the top visible resource is allocated to an owning application;
    receiving an arbitration request comprising owner information and requestor information, the owner information corresponding to an owning application to which the top visible resource is allocated, wherein the requesting information comprises a requesting application identifier or a requesting application group identifier corresponding to the requesting application;
    downloading a resource arbiter at the device; and
    arbitrating the arbitration request at the resource arbiter according to at least one arbitration rule to produce an arbitration decision to allocate the top visible resource to either the owning application or the requesting application, wherein the arbitration rule considers the relinquish list if the owning application corresponds to the application identified as privileged, and an identifier that identifies the requesting application corresponds to the application identifier or the group identifier in the relinquish list, wherein the arbitration decision is based on any information selected from a set of information items comprising the owner information, the requester information, device status information, device operating mode information, user preference information, and third party preference information.

18. The method of claim 17, further comprising downloading the at least one arbitration rule, wherein the step of arbitrating further comprises arbitrating based on information selected from the group consisting of the owner information, the requester information, device status information, device operating mode information, user preference information, and third party preference information.

19. The method of claim 17, wherein the step of arbitrating further comprises arbitrating based on a change to the relinquish list made by the owning application after receiving allocation of the top visible resource.

20. The method of claim 17, wherein the step of arbitrating further comprises arbitrating based on at least one arbitration rule that varies based on at least one of a time or an operating condition.

21. The method of claim 17, wherein the step of arbitrating further comprises arbitrating based on a reason provided by the requesting application for wanting access to the top visible resource.

22. The method of claim 17, wherein the step of arbitrating further comprises producing an arbitration decision that indicates that the top visible resource is to be allocated to either:
    the requesting application if the owner information indicates that the owning application is privileged, and if the requesting application identifier or the requesting application group identifier is identified in the relinquish list; or
    the owning application if the owner information indicates that the owning application is privileged, and if the requesting application identifier and the requesting application group identifier are not identified in the relinquish list.

23. The method of claim 17, further comprising:
    receiving the allocation request;
    determining that the top visible resource is allocated; and
    deriving the requestor information from the allocation request and the owner information from a top visible resource status to produce at least a portion of the arbitration request.

24. The method of claim 17, further comprising allocating the top visible resource according to the arbitration decision.

25. Apparatus for dynamically allocating a top visible resource on a device, the apparatus comprising:
    a processor comprising at least one arbitration rule, wherein the processor is operable to store a relinquish list for an application identified as privileged, wherein the application identified as privileged is allowed to specify in the relinquish list an application identifier or a group identifier corresponding to an identified application to which the application identified as privileged will relinquish control of the top visible resource, to receive an allocation request for access to the top visible resource from a requesting application, to determine that the top visible resource is allocated to an owning application, to receive an arbitration request comprising owner information and requestor information, the owner information corresponding to an owning application to which the top visible resource is allocated, wherein the requesting information comprises a requesting application identifier or a requesting application group identifier corresponding to the requesting application;
    wherein the processor is further operable to download a resource arbiter; and
    wherein the processor is further operable to arbitrate the arbitration request at the resource arbiter according to the at least one arbitration rule to produce an arbitration decision to allocate the top visible resource to either the owning application or the requesting application, wherein the arbitration rule considers the relinquish list if the owning application corresponds to the application identified as privileged, and an identifier that identifies the requesting application corresponds to the application identifier or the group identifier in the relinquish list, wherein the arbitration decision is based on any information selected from a set of information items comprising the owner information, the requester information, device status information, device operating mode information, user preference information, and third party preference information.

26. The apparatus of claim 25, wherein the processor is further operable to download the at least one arbitration rule, wherein the at least one arbitration rule further considers information selected from the group consisting of the owner information, the requester information, device status information, device operating mode information, user preference information, and third party preference information.

27. The apparatus of claim 25, wherein the at least one of the application or the group on the relinquish list is changed by the owning application after receiving allocation of the top visible resource.

28. The apparatus of claim 25, wherein the at least one arbitration rule varies based on at least one of a time or an operating condition.

29. The apparatus of claim 25, wherein the requestor information further comprises a reason provided by the requesting application for wanting access to the top visible resource, and wherein the arbitration rule further considers the reason provided by the requesting application.

30. The apparatus of claim 25, wherein the arbitration decision indicates that the top visible resource is to be allocated to either:
the requesting application if the owner information indicates that the owning application is privileged, and if the requesting application identifier or the requesting application group identifier is identified in the relinquish list; or
the owning application if the owner information indicates that the owning application is privileged, and if the requesting application identifier and the requesting application group identifier are not identified in the relinquish list.

31. The apparatus of claim 25, further comprising a top visible resource manager and a top visible resource status, wherein the top visible resource manager is operable to receive the allocation request, determine that the top visible resource is allocated, and derive the requestor information from the allocation request and the owner information from the top visible resource status to produce at least a portion of the arbitration request.

32. The apparatus of claim 25, further comprising a top visible resource manager operable to allocate the top visible resource according to the arbitration decision.

33. Apparatus for allocating a top visible resource on a device, comprising:
a processor comprising:
logic for storing a relinquish list for an application identified as privileged, wherein the application identified as privileged is allowed to specify in the relinquish list an application identifier or a group identifier corresponding to an identified application to which the application identified as privileged will relinquish control of the top visible resource;
logic for receiving an allocation request for access to the top visible resource from a requesting application;
logic for determining that the top visible resource is allocated to an owning application,
logic for receiving an arbitration request comprising owner information and requestor information, the owner information corresponding to an owning application to which the top visible resource is allocated, wherein the requesting information comprises a requesting application identifier or a requesting application group identifier corresponding to the requesting application;
logic for downloading a resource arbiter at the device; and
the resource arbiter operable to arbitrate the arbitration request according to at least one arbitration rule to produce an arbitration decision to allocate the top visible resource to either the owning application or the requesting application, wherein the arbitration rule considers the relinquish list if the owning application corresponds to the application identified as privileged, and an identifier that identifies the requesting application corresponds to the application identifier or the group identifier in the relinquish list, wherein the arbitration decision is based on any information selected from a set of information items comprising the owner information, the requester information, device status information, device operating mode information, user preference information, and third party preference information.

34. The apparatus of claim 33, wherein the resource arbiter is further operable to produce an arbitration decision that indicates that the top visible resource is to be allocated to either:
the requesting application if the owner information indicates that the owning application is privileged, and if the requesting application identifier or the requesting application group identifier is identified in the relinquish list; or
the owning application if the owner information indicates that the owning application is privileged, and if the requesting application identifier and the requesting application group identifier are not identified in the relinquish list.

35. The apparatus of claim 33, wherein the resource manager further comprises
logic for receiving the allocation request;
logic for determining that the top visible resource is allocated; and
logic for deriving the requestor information from the allocation request and the owner information from a top visible resource status to produce at least a portion of the arbitration request.

36. Apparatus for allocating a top visible resource on a device, comprising:
a computer-readable medium, storing:
means for storing a relinquish list for an application identified as privileged, wherein the application identified as privileged is allowed to specify in the relinquish list an application identifier or a group identifier corresponding to an identified application to which the application identified as privileged will relinquish control of the top visible resource;
means for receiving an allocation request for access to the top visible resource from a requesting application;
means for determining that the top visible resource is allocated to an owning application,
means for receiving an arbitration request comprising owner information and requestor information, the owner information corresponding to an owning application to which the top visible resource is allocated, wherein the requesting information comprises a requesting application identifier or a requesting application group identifier corresponding to the requesting application;
means for downloading a resource arbiter at the device; and
means for arbitrating the arbitration request at the resource arbiter according to at least one arbitration rule to produce an arbitration decision to allocate the top visible resource to either the owning application or the requesting application, wherein the arbitration rule considers the relinquish list if the owning application corresponds to the application identified as privileged, and an identifier that identifies the requesting application corresponds to the application identifier or the group identifier in the relinquish list, wherein the arbitration decision is based on any information selected from a set of information items comprising the owner information, the requester information, device status information, device operating mode information, user preference information, and third party preference information.

37. The apparatus of claim 36, wherein the means for arbitrating is further operable to produce an arbitration decision that indicates that the top visible resource is to be allocated to either:

the requesting application if the owner information indicates that the owning application is privileged, and if the requesting application identifier or the requesting application group identifier is identified in the relinquish list; or the owning application if the owner information indicates that the owning application is privileged, and if the requesting application identifier and the requesting application group identifier are not identified in the relinquish list.

38. The apparatus of claim 36, wherein the computer-readable medium further comprises:

means for receiving the allocation request;

means for determining that the top visible resource is allocated; and means for deriving the requestor information from the allocation request and the owner information from a top visible resource status to produce at least a portion of the arbitration request.

39. A computer-readable media comprising instructions, which when executed by a processor in a device, operate to provide an application priority system to allocate a top visible resource on a device, the computer-readable media comprising:

instructions for storing a relinquish list for an application identified as privileged, wherein the application identified as privileged is allowed to specify in the relinquish list an application identifier or a group identifier corresponding to an identified application to which the application identified as privileged will relinquish control of the top visible resource;

instructions for determining that the top visible resource is allocated to an owning application;

instructions for receiving an allocation request for access to the top visible resource from a requesting application;

instructions for receiving an arbitration request comprising owner information and requestor information, the owner information corresponding to an owning application to which the top visible resource is allocated, wherein the requesting information comprises a requesting application identifier or a requesting application group identifier corresponding to the requesting application;

instructions for downloading a resource arbiter at the device; and instructions for arbitrating the arbitration request at the resource arbiter according to at least one arbitration rule to produce an arbitration decision to allocate the top visible resource to either the owning application or the requesting application, wherein the arbitration rule considers the relinquish list if the owning application corresponds to the application identified as privileged, and an identifier that identifies the requesting application corresponds to the application identifier or the group identifier in the relinquish list, wherein the arbitration decision is based on any information selected from a set of information items comprising the owner information, the requester information, device status information, device operating mode information, user preference information, and third party preference information.

40. The computer-readable media of claim 39, wherein the instructions for arbitrating are further operable to produce an arbitration decision that indicates that the top visible resource is to be allocated to either:

the requesting application if the owner information indicates that the owning application is privileged, and if the requesting application identifier or the requesting application group identifier is identified in the relinquish list; or the owning application if the owner information indicates that the owning application is privileged, and if the requesting application identifier and the requesting application group identifier are not identified in the relinquish list.

41. The computer-readable media of claim 39, further comprising:

instructions for receiving the allocation request;

instructions for determining that the top visible resource is allocated; and instructions for deriving the requestor information from the allocation request and the owner information from a top visible resource status to produce at least a portion of the arbitration request.

* * * * *